United States Patent Office 3,413,336
Patented Nov. 26, 1968

3,413,336
PROCESS FOR THE PREPARATION OF ARYL ESTERS OF AROMATIC DICARBOXYLIC ACIDS
Hans-Leo Hülsmann, Witten-Rudinghausen, and Gustav Renckhoff, Witten (Ruhr), Germany, assignors to Chemische Werke Witten G.m.b.H., Witten (Ruhr), Germany
No Drawing. Filed July 31, 1964, Ser. No. 386,728
Claims priority, application Germany, Aug. 3, 1963, C 30,618
17 Claims. (Cl. 260—475)

ABSTRACT OF THE DISCLOSURE

Process for the preparation of diaryl esters of carbocyclic aromatic dicarboxylic acids which comprises heating a meta- or para-benzene dicarboxylic acid or an alkyl ester thereof with a phenolic compound and acetic anhydride in the presence of a suitable ester radical interchange catalyst, preferably butyl titanate, to above 140° C., and removing the acetic acid and/or alkyl acetate formed during the reaction as soon as possible from the reaction mixture. The process is particularly applicable to the preparation of diaryl esters of iso- and terephthalic acids, giving yields in excess of 90%.

This invention relates to the preparation of aryl esters of dicarboxylic acids. More particularly, it relates to a process for the preparation of diaryl esters of aromatic dicarboxylic acids. Even more particularly, the invention relates to the preparation of diaryl esters of aromatic dicarboxylic acids whose carboxyl groups are not ortho to each other.

Aryl esters of aromatic dicarboxylic acids have heretofore been prepared by reacting aromatic dicarboxylic acid chlorides with the corresponding phenols, whereby the reaction is carried out either by using the isolated acid chloride in the presence of an alkali or a tertiary amine, or by heating the free carboxylic acid with the phenol at high temperatures in the presence of acid chloride-forming substances. Because of the corrosion difficulties encountered when working with acid chlorides and because of the formation of decomposition products, which require complicated purification operations, the process is expensive and uneconomical.

The direct esterification of aromatic dicarboxylic acids with phenols in the presence of large amounts of phosphorus pentoxide or of polyphosphoric acid has also been previously described. This reaction, however, generally gives poor yields and leads to darkly colored products that are difficult to purify.

It is also known to prepare aromatic dicarboxylic acid aryl esters by reacting the carboxylic acids with diaryl carbonates in the presence of catalysts. However, this process does not eliminate working with acid chlorides, since phosgene must be used in the preparation of the diaryl carbonates.

It has already been proposed to prepare aryl esters of carbocyclic aromatic and aliphatic or alicyclic mono- and polycarboxylic acids by heating the methyl esters of these acids with monohydric phenols in the presence of ester radical interchange catalysts to temperatures above 160° C. and continuously removing the split-off methyl alcohol from the reaction mixture. This process proceeds much more simply and economically than the processes described hereinabove. But in the preparation of the diaryl esters of aromatic dicarboxylic acids, this process has the disadvantage that very long reaction times of from 20 to 30 hours are required for the reaction. Furthermore even after these long reaction times, relatively large proportions of the mixed methyl aryl esters are still present in the reaction mixture in addition to the desired diaryl esters. Thus, a fractional distillation or crystallization of the reaction product is additionally required for obtaining and recovering the pure diaryl esters.

One of the objects of the present invention is to provide an improved process for the preparation of diaryl esters of aromatic dicarboxylic acids which overcomes the disadvantages and deficiencies of the prior art methods.

Another object of the present invention is to provide a process for the preparation of diaryl esters of aromatic dicarboxylic acids which may be carried out in an efficacious and economical manner.

A further object of the invention is to provide a process that yields diaryl esters of aromatic dicarboxylic acids in high purity and in good yield.

A still further object of the invention is to provide a process for the preparation of diaryl esters of aromatic dicarboxylic acids which may be carried out easily and simply.

These and other objects of the present invention will become apparent to those skilled in the art from a reading of the following specification and claims.

In accordance with the present invention, it has been found that uniform diaryl esters of aromatic dicarboxylic acids, whose carboxyl groups are not in a neighboring position, i.e., not ortho to each other, may be prepared advantageously and rapidly by heating the corresponding acids or the alkyl esters thereof, which have 1 to 6 carbon atoms in the alkyl ester groups thereof with equivalent amounts or a slight excess of a phenol and acetic anhydride in the presence of ester radical interchange catalysts to temperatures above 140° C., and removing the freed acetic acid and, if desired, the alkyl acetate from the reaction mixture as rapidly as possible. The process is particularly applicable to the preparation of diaryl esters of iso- and terephthalic acids.

As ester radical interchange catalysts, antimony compounds, such as antimony trioxide, tin compounds, metallic magnesium and aluminum, and titanium compounds, particularly titanic acid esters, or mixtures of these substances, may be used. The catalysts are preferably used in amounts of from 0.1 to 5.0% by weight, relative to the amount of aromatic dicarboxylic acid or ester employed. Titanic acid esters, such as butyl titanate, are the preferred catalysts in the preparation of the aryl esters of terephthalic acid and the nuclear substitution products thereof.

The aromatic dicarboxylic acids used as starting materials in the process according to the present invention are those whose carboxyl groups are not in a neighboring position, i.e., ortho to each other. Particularly suitable for use herein are iso- and terephthalic acid and their derivatives, especially those mono- or bi-substituted in the nucleus, such as 5-chloroisophthalic acid, methylterephthalic acid, dichloroterephthalic acid, etc. Instead of the free dicarboxylic acids, it is possible to use the lower alkyl esters thereof having 1 to 6 carbon atoms in the alkyl group. The alkyl ester groups of the compounds used are positioned other than ortho to each other. The methyl esters are of particular efficacy in the method of the present invention.

As phenolic components to be used in the present invention, the monohydric phenols can be mentioned, for example, phenol, the isomeric cresols or xylenols, butylphenols, octylphenols, benzylphenols, β-naphthol, etc. Instead of the pure phenols, technical isomeric mixtures may also be utilized. One mole of phenol is employed for each carboxyl or carbalkoxy group to be reacted. In order to obtain as complete a reaction as possible, it may be expedient to work with a slight excess of phenol, but it is generally not advisable, for reasons of economics, to use an excess of more than 25%. Acetic anhydride is added to the phenol in an equivalent amount, i.e., 1 mole of acetic anhydride per mole of phenol. Here again, it may be expedient to use a slight excess of anhydride over and above the amount equivalent to the phenol so as to bind traces of moisture.

During the first phase of the reaction, 1 mole of acetic acid per mole of phenol is very rapidly generated as the aryl acetate is formed. The acetic acid thereby obtained should be distilled off the reaction mixture as quickly as possible. In the second reaction phase, if free dicarboxylic acids are utilized, the aryl acetate reacts with the dicarboxylic acid and acetic acid is freed, or if the lower alkyl esters are utilized, the aryl acetate undergoes an ester radical interchange reaction with the dicarboxylic acid alkyl ester while the corresponding alkyl acetate is cleaved off. Here again, in order to carry out the ester radical interchange reaction as completely and as rapidly as possible, the acetic acid or the alkyl acetate must be removed from the reaction mixture as rapidly as possible. Care should be taken, by means of distillation over a column, that the aryl acetate is not also simultaneously distilled off, but flows back into the reaction batch. The reaction temperature, which is initially at about 140° C., when a large proportion of acetic anhydride is still present, rises rapidly to the boiling point of the aryl acetate and thereafter rises more slowly as increasing amounts of aryl acetate are consumed in the course of the ester radical interchange. In order to avoid thermal decomposition of the products, the temperature should generally not be increased beyond 300° C. With high-boiling aryl acetates, it may therefore be advisable to apply a vacuum near the end of the reaction to remove the last amounts of acetic acid in order to avoid overheating of the reaction batch.

Any possible excess of aryl acetate is removed after termination of the ester radical interchange reaction, preferably by distillation under vacuum. The diaryl esters are obtained in a yield of over 90%. They may be easily obtained in any desired degree of purity by simple distillation or recrystallization.

It is surprising that the aryl esters of aromatic dicarboxylic acids can be obtained in a high degree of purity and yield according to the above-described process of the present invention, since it is well known that aryl acetates enter into rearrangement reactions very easily. Thus, for example, from a mixture of o-phthalic acid or phthalic anhydride, phenol and acetic anhydride, in the presence of butyl titanate as catalyst, no diphenyl-o-phthalate is obtained. Instead, a viscous oil is formed whose saponification number is considerably lower than that corresponding to the diphenyl ester and from which fluoran could be isolated by crystallization.

The diaryl esters of aromatic dicarboxylic acids, particularly those of iso- and terephthalic acids, prepared in accordance with the present invention possess technical importance as plasticizers and as intermediate products in organic syntheses, particularly for the preparation of polycondensation products.

The following examples are given merely as illustrative of the present invention and are not to be construed as limiting.

Example I 166 parts by weight of terephthalic acid (1 mole) and 235 parts by weight of phenol (2 moles+25%) are heated with 255 parts by weight of acetic anhydride (2 moles+25%), while adding thereto 1.6 parts by weight of butyl titanate, on a 50 cm. long column filled with Raschig rings whose jacket is heated to 120° C. The acetic acid formed is distilled off at the top of the column. The amount of acetic acid calculated for the formation of the phenyl acetate is distilled off after one half hour. During this time, the temperature in the reaction flask has risen from 140° to 195° C. After 5 hours, 274 parts by weight of acetic acid distills off and the ester radical interchange is terminated. At this point, the reaction temperature in the flask is about 250° to 260° C. During the distillation of the reaction mixture, 55 parts by weight of excess phenyl acetate is initially obtained at 80° C. and 2 torr and may be re-used in a new batch. 5 parts by weight of impure diphenyl terephthalate is obtained in the intermediate temperature range of 80 to 230° C. Thereafter, 296 parts by weight of diphenyl terephthalate is obtained by distillation at 230° C. and 1.5 torr. The product has a melting point of 199° to 200° C., an acid number of 0.5 and a saponification number of 353 (calculated as 353). The yield corresponds to 93% of the theoretical.

Example II 194 parts by weight (1 mole) of dimethyl terephthalate and 337 parts by weight (2 moles+10) of m-cresol are reacted, as described in Example I, with 224 parts by weight (2 moles+10%) of acetic anhydride during the addition thereto of 1.94 parts by weight of butyl titanate. A mixture of acetic acid and methyl acetate is distilled off the top of the column. The sump temperature rises from an initial 160° to 240° C. after 4 hours. The reaction is terminated after 281 parts by weight (calculated as 280 parts by weight) of a mixture of acetic acid and methyl acetate have distilled off. During the distillative preparation, 116 parts by weight of m-cresyl acetate is obtained at from 90° to 110° C. and 18 torr. After a brief intermediate run, there follows 310 parts by weight of terephthalic acid-di-m-cresyl ester at 245° to 255° C. and 0.4 torr, which has a melting point of 170° to 171° C. and a saponification number of 323 (calculated as 325). The yield amounts to 90% of the theoretical. If toluene sulfonic acid is used as the catalyst instead of butyl titanate in the present example, the reaction comes to a standstill after cleavage of the amount of acetic acid calculated for the formation of cresyl acetate, and no cleavage of methyl acetate whatsoever takes place.

Example III 166 parts by weight (1 mole) of isophthalic acid and 259 parts by weight (2 moles+20%) of m-cresol are reacted, as described in Example I, with 245 parts by weight (2 moles+20%) of acetic anhydride while addition is made thereto of 0.88 part by weight of magnesium shavings. The reaction temperature rises from an initial 140° C. to a final temperature of 250° C. within 7 hours. During this time, 299 parts by weight of acetic acid, which is rendered impure by traces of cresyl acetate, distills off. After an intermediate temperature range, during which 56 parts by weight of cresyl acetate, which may be re-used in a new batch is obtained, 308 parts by weight of isophthalic acid-di-m-cresyl ester is obtained by distillation of the reaction mixture at 225° to 235° C. and 0.4 torr. The product has a melting point of 97° to 98° C. and a saponification number of 327 (calculated as 325). The yield corresponds to 90% of the theoretical.

If 0.88 part by weight of dibutyl tin dilaurate is employed as the catalyst in the above example instead of the magnesium shavings, the reaction is equally terminated within 7 hours, whereas, with 0.8 part by weight of butyl titanate, the entire amount of acetic acid is split off after 3 hours.

Example IV 166 parts by weight of terephthalic acid (1 mole) and 259 parts by weight (2 moles+20%) of m-cresol are reacted, as described in Example I, with 245 parts by weight (2 moles—20%) of acetic anhydride while adding thereto 0.8 part by weight of butyl titanate. The reaction temperature rises from 140° to 260° C. within 3 hours. During this time, 267 parts by weight of acetic acid distills over. After a preliminary distillation of 43 parts by weight of m-cresyl acetate and an intermediate distillation of 6.2 parts by weight of diaryl ester product, 313 parts by weight of terephthalic acid-di-m-cresyl ester is obtained at 252° to 255° C. and 0.6 torr. The diaryl ester has a melting point of 170° to 171° C. and a saponification number of 326.5 (calculated as 325). The yield amounts to 90.5% of the theoretical.

If instead of butyl titanate, magnesium or aluminum powder or antimony trioxide or tin stearate or p-toluene sulfonic acid is used as the catalyst in the above example, the reaction comes to a standstill after the cleavage of the amount of acetic acid calculated for the formation of the cresyl acetate. A vigorous foaming sets in and only upon the addition of some butyl titanate does the ester radical interchange recommence, whereby acetic acid is split off.

The invention being thus described, it will be obvious that the same may be varied in many ways. Such variations are not to be regarded as a departure from the spirit and scope of the invention and all such modifications are intended to be included within the scope of the following claims.

We claim:

1. Process for the preparation of diaryl esters of carbocyclic aromatic dicarboxylic acids which comprises heating an aromatic compound selected from the group consisting of benzene dicarboxylic acids, the carboxyl groups of which are other than ortho to each other, and the alkyl esters of benzene dicarboxylic acids having 1 to 6 carbon atoms in the alkyl ester groups thereof, the alkyl ester groups of which are other than ortho to each other, with a phenolic compound selected from the group consisting of phenol, naphthol and alkyl- and aralkyl-substituted phenols and acetic anhydride in the presence of a suitable ester radical interchange catalyst to temperatures above 140° C. and distilling the acetic acid formed in the resultant reaction from the reaction mixture.

2. Process according to claim 1, wherein the aromatic compound is an alkyl ester of a benzene dicarboxylic acid having 1 to 6 carbon atoms in the alkyl ester groups thereof, the alkyl ester groups of which are other than ortho to each other, and wherein the alkyl acetate formed in the resultant reaction is distilled from the reaction mixture in addition to the acetic acid.

3. Process according to claim 1, wherein the aromatic compound is isophthalic acid.

4. Process according to claim 1, wherein the aromatic compound is terephthalic acid.

5. Process according to claim 1, wherein the aromatic compound is a nuclear-halogen or nuclear-alkyl substituted derivative of an acid selected from the group consisting of isophthalic acid and terephthalic acid.

6. Process according to claim 1, wherein the aromatic compound is a dimethyl ester of a benzene dicarboxylic acid, the ester groups of which are other than ortho to each other.

7. Process according to claim 1, wherein a molar amount of the phenol and acetic anhydride equivalent to the number of reactive carboxyl and carbalkoxy groups in the aromatic compound is employed in the heating step.

8. Process according to claim 1, wherein an excess of the phenol and acetic anhydride over the molar amount equivalent to the number of reactive carboxyl and carbalkoxy groups in the aromatic compound is employed in the heating step.

9. Process according to claim 1, wherein the ester radical interchange catalyst is selected from the group consisting of antimony oxide, carboxylic acid esters of tin, alkyl esters of titanic acid, metallic magnesium, metallic aluminum, and mixtures thereof.

10. Process according to claim 9, wherein 0.1 to 5.0% by weight, based on the amount of aromatic compound, of the ester radical interchange catalyst is employed.

11. Process according to claim 6, wherein 0.1 to 5.0% by weight, based on the amount of aromatic compound, of a compound selected from the group consisting of antimony oxide, carboxylic acid esters of tin, alkyl esters of titanic acid, metallic magnesium, metallic aluminum, and mixtures thereof is used as the ester radical interchange catalyst.

12. Process according to claim 3, wherein the ester radical interchange catalyst is butyl titanate.

13. Process according to claim 4, wherein the ester radical interchange catalyst is butyl titanate.

14. Process according to claim 5, wherein the ester radical interchange catalyst is butyl titanate.

15. Process according to claim 6, wherein the ester radical interchange catalyst is butyl titanate.

16. Process for the preparation of diaryl esters of terephthalic acid which comprises heating terephthalic acid with a phenolic compound selected from the group consisting of phenol, naphthol and alkyl- and aralkyl-substituted phenols and acetic anhydride in the presence of 0.1 to 5% by weight, based on the amount of terephthalic acid, of butyl titanate to temperatures above 140° C. and distilling the acetic acid formed in the resultant reaction from the reaction mixture.

17. Process for the preparation of diaryl esters of dimethyl terephthalate which comprises heating dimethyl terephthalate with a phenolic compound selected from the group consisting of phenol, naphthol and alkyl- and aralkyl-substituted phenols and acetic anhydride in the presence of 0.1 to 5% by weight, based on the amount of dimethyl terephthalate, of butyl titanate to temperatures above 140° C. and distilling the acetic acid and methyl acetate formed in the resultant reaction from the reaction mixture.

References Cited

FOREIGN PATENTS 314,646   7/1929   Great Britain.

LORRAINE A. WEINBERGER, *Primary Examiner.*

T. L. GALLOWAY, *Assistant Examiner.*